United States Patent [19]

Pilgrim et al.

[11] 3,860,589

[45] Jan. 14, 1975

[54] TETRAZINE HERBICIDES

[75] Inventors: Kurt H. G. Pilgrim; Richard D. Skiles, both of Modesto, Calif.

[73] Assignee: Shell Oil Company, Houston, Tex.

[22] Filed: July 23, 1973

[21] Appl. No.: 381,934

[52] U.S. Cl. ................................. 260/241, 71/92
[51] Int. Cl. ........................................ C07d 55/58
[58] Field of Search ............................... 260/241

[56] References Cited

UNITED STATES PATENTS 2,817,662   12/1957   Carboni ............................ 260/241

Primary Examiner—Henry R. Jiles
Assistant Examiner—Robert T. Bond

[57] ABSTRACT

3-aromatic-6-perfluoroalkyl-s-tetrazines and their use as herbicides.

7 Claims, No Drawings

TETRAZINE HERBICIDES

SUMMARY OF THE INVENTION

It has been found that tetrazines of formula I following are active herbicides, primarily in post-emergence application.

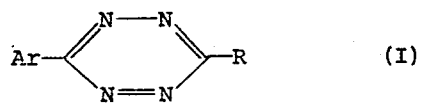

wherein "Ar" represents an optionally substituted aromatic moiety and R represents a perfluoroalkyl moiety.

PREFERRED EMBODIMENTS OF THE INVENTION

In formula (I), "Ar" can represent phenyl, or substituted phenyl. When it represents substituted phenyl, there may be from 1 to 3 substituents, located on the carbon atoms in the 3, 4 and/or 5 positions. Suitable substituents include halogen (F, Cl, Br, I); $C_{1-5}$ alkyl; $C_{1-5}$ mono- and polyhaloalkyl; $C_{1-5}$ alkoxy; $C_{1-5}$ mono- and polyhaloalkoxy; $C_{1-5}$ alkylthio, sulfinyl and sulfonyl; $C_{1-5}$ mono- and polyhaloalkylthio, sulfinyl and sulfonyl; nitro; cyano; carboxy; amino, $-NR^1R^2$ wherein $R^1$ and $R^2$ each is hydrogen or $C_{1-5}$ alkyl; or sulfamoyl, $-SO_2NR^1R^2$ wherein $R^1$ and $R^2$ each is hydrogen or $C_{1-5}$ alkyl. Preferably, because of the activity of the compounds in which they appear, the substituent(s) is or are one(s) of: $C_{1-4}$ alkyl, most preferred being methyl; halogen, most preferred being chlorine, then bromine; nitro; $C_{1-3}$ perfluoroalkyl, trifluoromethyl being most preferred.

In formula (I), R preferably represents $C_1$-$C_7$-perfluoroalkyl, and preferably $C_1$-$C_3$-perfluoroalkyl because of the activity of the compounds containing these moieties.

Typical, representative species of this class of compounds are described in the working examples included hereinafter. Other representative species include:
- 3-(4-nitrophenyl)-6-trifluoromethyl-s-tetrazine;
- 3-(4-bromophenyl)-6-trifluoromethyl-s-tetrazine;
- 3-(4-methoxyphenyl)-6-trifluoromethyl-s-tetrazine;
- 3-(3-(trifluoromethoxy)phenyl)-6-trifluoromethyl-s-tetrazine;
- 3-(3,4-xylyl)-6-pentadecaafluoroheptyl-s-tetrazine;
- 3-(4-isobutylphenyl)-6-trifluoromethyl-s-tetrazine;
- 3-(3,4,5-trimethylphenyl)-6-trifluoromethyl-s-tetrazine;
- 3-(4-cyanophenyl)-6-trifluoromethyl-s-tetrazine;
- 3-(3-(trifluoromethylthio)phenyl)-6-trifluoromethyl-s-tetrazine;
- 3-(4-carboxyphenyl)-6-trifluoromethyl-s-tetrazine;
- 3-(4-dimethylaminophenyl)-6-trifluoromethyl-s-tetrazine;
- 3-(3-dimethylsulfamoylphenyl)-6-trifluoromethyl-s-tetrazine;
- 3-(3-methylthiophenyl)-6-trifluoromethyl-s-tetrazine;
- 3-(3-methylsulfinylphenyl)-6-trifluoromethyl-s-tetrazine;
- 3-(3-methylsulfonylphenyl)-6-trifluoromethyl-s-tetrazine;

The compounds of this invention can be prepared according to the following sequence of reactions:

I. The appropriate aromatic hydrazide,

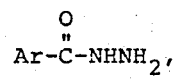

is treated with a perfluorinated aldehyde, its hydrate or hemiacetal,

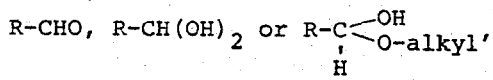

to give the adduct: 2-(1-hydroxy-1-perfluoroalkyl)hydrazide. Ar-C(O)NHNH-CH(OH)R.

II. That hydrazide is dehydrated to give the 2-(perfluoroalkylidene)hydrazide, ArC(O)NHN=CHR.

III. That hydrazide is then treated to replace the carbonyl oxygen by chlorine to give the chloroazine, Ar-C(Cl)=N-N=CHR.

IV. The chloroazine then is chlorinated to form the dichloroazine, Ar-C(Cl)=N-N=C(Cl)R.

V. The dichloroazine then is treated with hydrazine to yield the desired dihydrotetrazine.

VI. The dihydrotetrazine is oxidized to the tetrazine by treatment with a mild oxidizing agent, such as bromine, iodine, chlorine, hydrogen peroxide, ferric chloride, potassium ferricyanide and nitric acid.

Reaction I is readily conducted by mixing a small excess of the perfluoroaldehyde reactant with the aromatic hydrazide in a solvent such as water, ethanol or benzene at room temperature or at a moderately elevated temperature, for example up to 100°C. A convenient and effective technique is to employ the aldehyde hydrate and conduct the reaction under benzene reflux conditions, removing the water formed in the reaction essentially as fast as it is formed, in the form of the benzene/water azeotrope. If the acetal is employed, the reaction is enhanced by the presence of a catalytic amount of a non-oxidizing mineral acid, such as hydrochloric acid.

Reaction II can be effected by two different techniques: in the first, the dehydration is effected by heating the hydroxy-hydrazide at a moderately elevated temperature -- from about 50°C to about 150°C -- under reduced pressure in a vacuum oven, removing the water as formed. In the other, the hydroxy-hydrazide is treated at room temperature with an excess of thionyl chloride to yield the alkylidene-hydrazide.

It is to be noted that the alkylidene-hydrazide can be prepared directly from the original hydrazide, by conducting the reaction of the hydrazide and perfluoroaldehyde reactant in refluxing benzene and in the presence of a catalytic amount of p-toluenesulfonic acid.

Reaction III is conveniently conducted by dissolving the alkylidene-hydrazide in an excess of thionyl chloride and maintaining the solution under thionyl chloride reflux conditions for a sufficient time. A catalytic amount of dimethylformamide may be found helpful in some cases.

It is to be noted also that Reactions II and III can be conducted in sequence in thionyl chloride, the hydroxy-hydrazide first being dehydrated at room temperature, then the mixture being heated to reflux to effect the chlorination.

Reaction IV is carried out by adding a small excess of chlorine to a solution of the chloro-azine of Reaction III in carbon tetrachloride or glacial acetic acid at room temperature.

Reaction V is conducted by mixing the approximately stoichiometric amounts of the reactants at a temperature of about 0°C to about 10°C, in a solvent such as diethyl ether, tetrahydrofuran, ethanol or dioxane.

Reaction VI is conducted by treating the dihydrotetrazine in a suitable solvent with the oxidizing agent, at a moderately elevated temperature -- e.g., 40°–80°. A suitable solvent when hydrogen peroxide is used is glacial acetic acid. When one of the other oxidizing agents is used, suitable solvents include ethanol/water and tetrahydrofuran/water.

The manner in which the compounds of this invention can be prepared by the foregoing methods is illustrated in the following examples, which demonstrate the preparation of typical species of the compounds of the invention. In these examples, the identities of all products, intermediate and final, were confirmed by elemental analysis and by infrared and nuclear magnetic resonance spectral analyses. 3-phenyl-6-trifluoromethyl-s-tetrazine (I)

EXAMPLE I 3-phenyl-6-trifluoromethyl-s-tetrazine(I)

a. Preparation of benzoic acid, 2-(1-hydroxy-2,2,2-trifluoroethyl)hydrazide (Ia)

To warm (55°) solution of 110 grams (0.81 mole) of benzhydrazide in 600 milliliters of water was added rapidly 99.6 grams (0.86 mole) of trifluoroacetaldehyde hydrate. A colorless solid precipitated immediately. The stirred reaction mixture then was heated to 80°–90° and stirred for one hour. It was then cooled to room temperature and filtered to give 138 grams of colorless solid. Concentration of the filtrate to dryness yielded 30.6 grams of product. The total product (89 percent yield), a colorless crystalline solid, melting point: 168°–171° (with decomposition), was identified as Ia.

b. Preparation of benzoic acid, (2,2,2-trifluoroethylidene)hydrazide (Ib)

A slurry of 168.6 grams (0.771 mole) of Ia in 600 milliliters of thionyl chloride was stirred at room temperature until evolution of gases (hydrogen chloride and sulfur dioxide) had ceased (about 30 minutes). The reaction mixture was concentrated under reduced pressure and the residue was recrystallized from methanol to give 156 grams (100 percent yield) of Ib, as a colorless crystalline solid, melting point: 191°–193°.

c. Preparation of trifluoroacetaldehyde, azine with α-chlorobenzaldehyde (Ic)

A mixture of 120 grams (0.51 mole) of Ib in 250 milliliters of thionyl chloride was heated to reflux and refluxed for 18 hours. Then the mixture was concentrated and distilled under reduced pressure to give 99.5 grams (83 percent yield) of Ic, as an amber liquid, boiling point: 68°–72° at 0.5 Torr.

d. Preparation of trifluoroacetyl chloride, azine with benzoyl chloride (Id)

51.2 grams (0.72 mole) of chlorine was gradually passed, over a period of 5 hours, into a solution of 169 grams (0.72 mole) of Ic in 500 milliliters of glacial acetic acid. The temperature of the mixture rose to 50°C. Concentration of the mixture under reduced pressure gave an oil. The oil was dissolved in methylene chloride, and the solution was washed with cold aqueous sodium bicarbonate solution, then with water. After drying, the solution was distilled to give 135 grams (70 percent yield) of Id, as a light red liquid boiling point: 66°–68° at 0.05 Torr.

e. Preparation of 3-phenyl-6-trifluoromethyl-1,2-dihydro-s-tetrazine (Ie)

To a solution of 13.5 grams (0.05 mole) of Id in 100 milliliters of ethanol was added at 0°–5° with stirring 5.1 grams (0.15 mole) of 95 percent hydrazine. The mixture was stirred at room temperature for 3 hours and then concentrated under reduced pressure, and the residue was washed with water and filtered. Recrystallization of the residue from benzene gave 10.5 grams (95 percent yield) of Ie, as a yellow crystalline solid, melting point: 156°–159°.

f. Preparation of I

A solution of 90 grams (0.56 mole) of ferric chloride in 250 milliliters of water was added to a warm (40°) solution of 68 grams (0.3 mole) of Ie in 350 milliliters of ethanol and 175 milliliters of water. The mixture was briefly heated to 80°, then cooled and filtered. Recrystallization of the filter cake from hexane gave 54 grams (81 percent) yield of I, as a red crystalline melting point: 154°–156°. 175

EXAMPLE II 3-pentafluoroethyl-6-phenyl-s-tetrazine. (II)

a. Preparation of benzoic acid, 2-(2,2,3,3-pentafluoropropylidene)hydrazide (IIa)

40 grams (0.22 mole) of pentafluoropropionaldehyde hemiacetal was added to a warm (50°) solution of 27.2 grams (0.20 mole) of benzhydrazide in 300 milliliters of ethanol containing 10 drops of concentrated hydrochloric acid. The mixture was heated to reflux and refluxed for 2.5 hours, then chilled to 50° and filtered to give 43 grams (81 percent yield) of IIa, as a colorless crystalline solid, melting point: 150°–152°.

b. Preparation of benzoyl chloride, azine with pentafluoropropionaldehyde (IIb)

A solution of 44 grams (0.165 mole) of IIa in 150 milliliters of thionyl chloride containing 10 drops of dimethyl formamide was heated to reflux and refluxed for 2 hours. The mixture then was concentrated to dryness under reduced pressure to give 48 grams (100% yield) of IIb, as a light yellow oil.

c. Preparation of benzoyl chloride, azine with pentafluorobutyryl chloride (IIc)

A solution of 48 grams (0.175 mole) of IIb in 250 milliliters of carbon tetrachloride at 30° was saturated with chlorine. After 3 days at room temperature the mixture was concentrated under reduced pressure to give 50.5 grams (94 percent yield) of IIc, as a light yellow oil.

d. Preparation of 3-pentafluoroethyl-6-phenyl-1,2-dihydro-s-tetrazine (IId)

A solution of 31.9 grams (0.1 mole) of IIc in 150 milliliters of ethanol at 0° was treated with 10.1 grams (0.03 mole) of 95 percent hydrazine. The ethanol was removed under reduced pressure and the residue was recrystallized from benzene to give 22 grams (79 percent yield) of IId, as a yellow crystalline solid, melting point: 161°–163°.

e. Preparation of II 20 milliliters of 30 percent hydrogen peroxide was added to 14 grams (0.05 mole) of IId in 150 milliliters of glacial acetic acid at room temperature. The mixture then was gradually heated to 70° and held at that temperature for 2 hours. The mixture then was cooled to 10°, diluted with 100 milliliters of water and filtered.

Recrystallization of the filter cake from methanol gave 7 grams (51 percent yield) of II as a red crystalline solid, melting point: 117°–120°.

EXAMPLES III THROUGH XIV

In the manner hereinbefore described, and illustrated in Examples I and II, the following further species of the compounds of this invention were prepared.

TABLE I

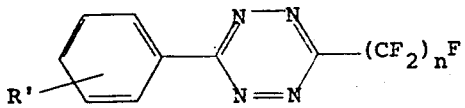

| Example No. | R' | n | Melting point (°) |
| --- | --- | --- | --- |
| III | H | 3 | 87–89 |
| IV | 3-$CH_3$- | 1 | 62–64 |
| V | 3-$CF_3$- | 1 | * |
| VI | 4-Cl-3,5-$(CH_3)_2$- | 1 | 133–135 |
| VII | 4-$CH_3$- | 1 | 152–154 |
| VIII | 4-$(CH_3)_3C$- | 1 | 73–75 |
| IX | 4-Cl | 1 | 92–94 |
| X | 3,4-$(CH_3)_2$- | 1 | 65–67 |
| XI | 3,4-$Cl_2$ | 1 | 90–92 |
| XII | 4-$NO_2$ | 1 | 129–131 |
| XIII | 3,5-$(CH_3)_2$- | 1 | 125–128 |

Liquid, boiling point not determined.

Compounds of this invention have been found to be herbicidally effective with regard to a variety of plant species, including economically important species of grasses and broad-leaved weeds. They have been found to be active pre-emergence (applied to the soil prior to germination of the plant seeds) but are primarily of interest for post-emergence application (applied to the foliage of the plant).

Accordingly, herbicidal compositions of this invention comprise at least one tetrazine of Formula I and an inert agriculturally acceptable carrier therefor. Undesirable plant growth is destroyed or prevented by applying an effective amount of at least one of the tetrazines of Formula I, ordinarily in a herbicidal composition of one of the types described hereinafter to either the unwanted vegetation itself or to the area to be kept free of such unwanted vegetation.

The amount of tetrazine required for controlling unwanted plants will naturally depend upon the variety or varieties of plants involved, whether the herbicide is to be applied pre-emergence or post-emergence, the kind and condition of the soil (if applied pre-emergence) or the age and condition of the plants (if applied post-emergence), the degree of control desired, the character of the formulation used, the mode of application, the climate, the season of the year and other variables which must be and are taken into account by practioners of the art of chemical control of unwanted plants. Recommendations as to precise dosages are therefore not possible. In general, however, when applied pre-emergence to a locus to be protected, dosages of from about 0.1 to about 10 pounds per acre of the tetrazine will be satisfactory. When applied post-emergence, the usual practice is to spray or dust the foliage of the plants to apply the needed dosage to the foliage. The nominal dosage in this case also is from about 0.1 to about 10 pounds per acre of the tetrazine. Liquid and dust formulations for such application ordinarily contain from about ½ to 10 percent of the tetrazine.

The tetrazine may be formulated as wettable powders, dusts, granules, solutions, emulsifiable concentrates, emulsions, suspension concentrates and aerosols. Wettable powders are usually compounded to contain from about 25 to about 75 percent by weight of toxicant and usually contain in addition to solid carrier, 3–10 percent by weight of a dispersing agent and, where necessary, up to 10 percent by weight of stabilizer(s) and/or other additives such as penetrants or stickers. Dusts are usually formulated as a concentrate having a similar composition to that of a wettable powder but without a dispersant, and are diluted in the field with further solid carrier to give a composition usually containing ½–10 percent by weight of toxicant. Generally, granules will contain ½–25 percent by weight toxicant and 0–10 percent by weight of additives such as stabilizers, slow release modifiers and binding agents. Any of the solid materials commonly used for formulating agricultural chemicals can be used. Examples include: talc, clays, pumice, diatomaceous earth, silica, walnut granules and flour, chalk and the like. Emulsifiable concentrates usually contain, in addition to the solvent and, when necessary, co-solvent, 10–50 percent weight per volume toxicant, 2–20 percent weight per volume emulsifiers and 0–20 percent weight per volume of appropriate additives such as stabilizers, penetrants and corrosion inhibitors. Suitable solvents include aromatic hydrocarbons such as benzene, toluene, xylene; chlorobenzene; esters such as ethyl acetate; alcohols such as methanol, ethanol, cellosolve; ketones such as acetone, methyl ethyl ketone, diethyl ketone; ethers such as diethyl ether, tetrahydrofuran, dioxane, methyl cellosolve. Suspension concentrates are compounded so as to obtain a stable, non-sedimenting flowable product and usually contain 10–75 percent by weight of toxicant, 0.5–15 percent by weight of dispersing agents, 0.1–10 percent by weight of suspending agents such as protective colloids and thixotropic agents, 0–10 percent by weight of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

Aqueous dispersions and emulsions of these formulations are obtained by diluting such wettable powders or concentrates with water. The said emulsions may be of the water-in-oil or of the oil-in-water type, and may have a thick mayonnaiselike consistency.

The compositions containing the tetrazine may also contain other ingredients, for example, other compounds possessing pesticidal, especially insecticidal, acaricidal, herbicidal or fungicidal, properties.

The pre-emergence herbicidal activity of the compounds of the invention was evaluated by planting seeds of watergrass and cress in test tubes, nominally measuring 25 × 200 millimeters, containing soil treated with the test compounds at the rate of 0.1 and 1 milligrams of the active compound per tube designated in Table II as Rates I and II, respectively. The planted soil was held under controlled conditions of temperature, moisture, and light for 13 to 14 days. The amount of germination was then noted and the effectiveness of the test compound was rated on the basis of a 0 to 9 scale, 0 rating indicating no effect, 9 indicating death of the seedlings or no germination.

The post-emergence activity of the compounds of this invention was evaluated by spraying 10-day old pigweed plants and 7-day old crabgrass plants to runoff with a liquid formulation of the test compound at the rates of 0.62 milliliters of a 0.04 percent solution designated Rate I in Table II, and 0.56 milliliters of a 0.5 percent solution designated Rate II in Table II. The sprayed plants were held under controlled conditions for 10 to 11 days and the effect of the test chemical was then evaluated visually, the results being rated on the 0 to 9 scale described above.

The results of the tests are summarized in Table II.

TABLE II

HERBICIDAL ACTIVITY

| Compound of Example | Pre-emergence | | | | Post-emergence | | | |
|---|---|---|---|---|---|---|---|---|
| | Watergrass | | Cress | | Crabgrass | | Pigweed | |
| | Rate I | Rate II | Rate I | Rate II | Rate I | Rate II | Rate I | Rate II |
| I | 2 | 6 | 5 | 9 | 8 | 8 | 9 | 9 |
| II | 1 | 7 | 9 | 9 | 5 | 9 | 9 | 9 |
| III | 2 | 8 | 9 | 9 | 7 | 9 | 7 | 9 |
| IV | 3 | 6 | 7 | 9 | 8 | 9 | 9 | 9 |
| V | 0 | 1 | 5 | 9 | 1 | 9 | 7 | 9 |
| VI | 6 | 8 | 7 | 9 | 9 | 9 | 9 | 9 |
| VII | 0 | 7 | 8 | 9 | 9 | 9 | 9 | 9 |
| VIII | 2 | 9 | 9 | 9 | 8 | 9 | 9 | 9 |
| IX | 0 | 8 | 7 | 9 | 9 | 9 | 9 | 9 |
| X | 5 | 9 | 9 | 9 | 9 | 9 | 9 | 9 |
| XI | 0 | 0 | 0 | 9 | 7 | 9 | 9 | 9 |
| XII | 0 | 0 | 4 | 6 | 7 | 7 | 9 | 9 |
| XIII | 1 | 5 | 5 | 9 | 2 | 9 | 9 | 9 |

The post-emergence herbicidal activity of compounds of this invention was determined with respect to several common species of weeds, by spraying a formulation of the test compound on to the foliage of the plants. The soil was held in containers that isolated that soil into a narrow band, or row. The solution of test chemical was sprayed over the band, from one end to the other, the concentration of the test compound in the formulation varying logarithmically from a higher value at one end of the band to a lower value at the other end of the band. The effect of the test chemical was evaluated visually and reported as the nominal rate of application, in pounds of test chemical per acre of the soil band, at which 90 percent inhibition of the growth of the weeds occurred, this being referred to as the 90 percent growth inhibition, or $GI_{90}$, dosage. Results of the post-emergence tests, as well as the weed species involved, are set out in Table III.

TABLE III

POST-EMERGENCE TESTS
WEED SPECIES

| Compound of Example | Downy Brome | Crabgrass | Watergrass | Pigweed | Mustard | Curly Dock |
|---|---|---|---|---|---|---|
| I | >10 | 1.2 | 9.3 | <1 | <1 | <1 |
| II | 4.0 | >5 | >5 | <0.5 | <0.5 | <0.5 |
| III | >5 | 2.8 | 3.8 | 2.8 | <0.5 | <0.5 |
| IV | >5 | 1.2 | 1.6 | <0.5 | <0.5 | >5 |
| VI | >5 | 2.8 | >5 | 0.8 | <0.6 | >5 |
| VIII | >5 | 0.7 | | <0.6 | <0.6 | >5 |
| VIII | >5 | 0.7 | 3.8 | 0.9 | <0.6 | >5 |
| IX | >5 | >5 | 1.7 | <0.5 | <0.5 | <0.5 |
| X | >10 | 3.7 | >10 | <1.3 | <1.3 | >10 |
| XII | >5 | >5 | >5 | 1.6 | >5 | >5 |
| XIII | >5 | >5 | >5 | 0.9 | 0.8 | >5 |

What is claimed is:

1. A compound of the formula:

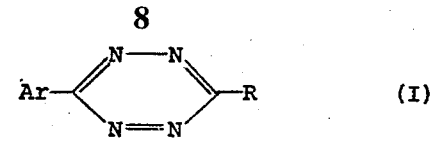

wherein Ar is phenyl or phenyl substituted by from 1 to 3 substituents located on the carbon atoms in the 3-,4- and 5-positions on the ring relative to the carbon bonded to the tetrazine ring and selected from halogen; nitro; cyano; carboxy-, a moiety having from 1 to 5 carbon atoms selected from the group consisting of alkyl, mono- and polyhaloakyl, alkoxy, mono- and polyhaloalkoxy, alkylthio, alkylsulfinyl, alkylsulfonyl, mono- and polyhaloalkylthio, mono- and polyhaloalkylsulfinyl and mono- and polyhaloalkylsulfonyl; amino ($-NR^1R^2$, wherein $R^1$ and $R^2$ each is hydrogen or $C_1$-$C_5$-alkyl); or sulfamoyl and $R^2$ is each hydrogen or $C_1$-$C_5$ alkyl) ($-SO_2NR^1R^2$, wherein $R^1$, and R is $C_1$-$C_7$-perfluoroalkyl.

2. A compound according to claim 1 wherein Ar is phenyl or phenyl substituted by from 1 to 3 of $C_1$-$C_4$ alkyl; halogen; or $C_1$-$C_3$ perfluoroalkyl.

3. A compound according to claim 2 wherein Ar is phenyl and R is $C_1$-$C_3$ perfluoroalkyl.

4. A compound according to claim 3 wherein R is trifluoromethyl.

5. A compound according to claim 2 wherein Ar is 3,4-dimethylphenyl and R is trifluoromethyl.

6. A compound according to claim 2 wherein Ar is 3,5-dimethylphenyl and R is trifluoromethyl.

7. A compound according to claim 2 wherein Ar is 4-tertiary-butylphenyl and R is trifluoromethyl.

* * * * *